(12) United States Patent
Keller

(10) Patent No.: US 6,916,431 B2
(45) Date of Patent: Jul. 12, 2005

(54) PRECIPITATING CHEMICAL

(75) Inventor: Stig Ovar Keller, Stavanger (NO)

(73) Assignee: Nature Technology Solution AS (NO)

( * ) Notice: Subject to any disclaimer, the term of this patent is extended or adjusted under 35 U.S.C. 154(b) by 66 days.

(21) Appl. No.: 10/239,468

(22) PCT Filed: Feb. 21, 2001

(86) PCT No.: PCT/NO01/00063
§ 371 (c)(1),
(2), (4) Date: Sep. 23, 2002

(87) PCT Pub. No.: WO01/79120
PCT Pub. Date: Oct. 25, 2001

(65) Prior Publication Data
US 2004/0026331 A9 Feb. 12, 2004

(30) Foreign Application Priority Data
Mar. 22, 2000 (NO) .......................................... 20001498

(51) Int. Cl.⁷ ................................................. C02F 1/56

(52) U.S. Cl. ....................... 252/181; 210/666; 210/716; 210/728

(58) Field of Search ............................... 210/665–667, 210/702, 714, 716, 728; 252/175, 181

(56) References Cited

U.S. PATENT DOCUMENTS

| | | | |
|---|---|---|---|
| 3,617,561 A | * 11/1971 | Fanselow | 210/727 |
| 3,997,439 A | * 12/1976 | Ayukawa | 210/719 |
| 4,353,803 A | 10/1982 | Dover, Jr. | |
| 4,415,467 A | * 11/1983 | Piepho | 252/181 |
| 4,765,908 A | * 8/1988 | Monick et al. | 210/666 |

(Continued)

FOREIGN PATENT DOCUMENTS

| | | |
|---|---|---|
| DE | 42 00 479 A1 | 7/1992 |
| DE | 42 23 285 A1 | 1/1994 |
| FR | 2 679 546 A1 | 1/1993 |
| JP | 56-158194 A | 12/1981 |
| SE | 501 216 C2 | 12/1994 |
| WO | WO-98/57888 A1 | 12/1998 |

OTHER PUBLICATIONS

Demel, I. et al., Improving the Settling of Activated Sludge by Chemical Additives, Wat. Sci. Tech. vol. 20, No. 1, pp. 283–286, 1988, Great Britain.

Demel, I. et al., Möglichkeiten Zur Leistungssteigerung Biologischer Abwasserreinigungsanlagen Von Zellstoff–Fabriken Durch Physikalisch–Chemische Massnahmen Vor Und Nach Der Biologischen Reinigung, Wochenblatt Für Papierfabrikation 5, pp. 179–188, 1990.

Primary Examiner—Peter A. Hruskoci
(74) Attorney, Agent, or Firm—Akerman Senterfitt

(57) ABSTRACT

The invention concerns, among other things, a precipitating chemical for separating preferably hydrocarbons from water, but also for separating other dissolved and/or suspended organic and/or inorganic substances and particles in an associated liquid, including mineral and/or rock particles, heavy metals, salts, phosphorous compounds, alcohols, lipids, aromatics and cellulose. The precipitating chemical is composed of bentonite, preferably sodium montmorillonite; of polymer, preferably of the polyacrylamide type; of sodium polyphosphate and/or lignite; and of water. The chemical is added to and mixed with waste liquid, after which chemical precipitation is activated through the addition of acid or base until the pH-value of the liquid mixture is 4.0 or less, or the pH-value being 8.0 or more. The liquid mixture then rests until the contaminant(s) flakes and separates from the liquid phase of the mixture and is then deposited or floated from the liquid mixture. Said precipitating chemical is generally more simple to use, easier to produce and more efficient for purification and covers more different conditions of operational contamination than correspondingly in known technique.

3 Claims, 6 Drawing Sheets

U.S. PATENT DOCUMENTS

Figure 1:
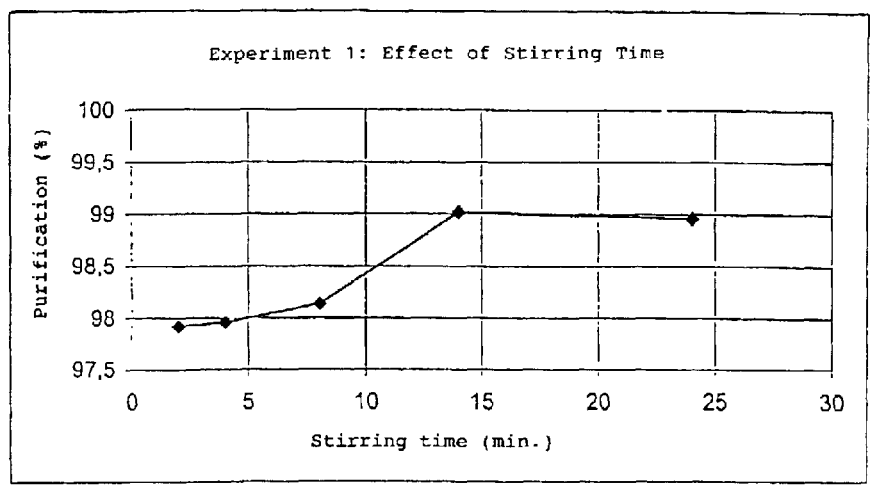

| | | |
|---|---|---|
| 4,980,025 A | 12/1990 | Andersson et al. |
| 5,204,007 A | 4/1993 | Mosley et al. |
| 5,320,773 A * | 6/1994 | Perman et al. ............... 252/191 |
| 6,132,625 A * | 10/2000 | Moffett ....................... 210/727 |

* cited by examiner

Table 1

| Water before treatment | | | Precipitating chemical added | Stirring time | Water after treatment | | |
|---|---|---|---|---|---|---|---|
| Test volume (ml) | Acidity (pH) | Oil concentration (ppm) | (g of dry matter) | (min.) | Acidity (pH) | Oil concentration (ppm) | purification (%) |
| 900 | 6,5 | 330 | 0,53 | 2 | 2,5 | 6,85 | 97,92 |
| 900 | 6,5 | 330 | 0,53 | 4 | 2,5 | 6,71 | 97,96 |
| 900 | 6,5 | 330 | 0,53 | 8 | 2,5 | 6,11 | 98,14 |
| 900 | 6,5 | 330 | 0,53 | 14 | 2,5 | 3,24 | 99,02 |
| 900 | 6,5 | 330 | 0,53 | 24 | 2,5 | 3,43 | 98,96 |

Table 2

| Water before treatment ||| Precipitating chemical added (g of dry matter) | Stirring time (min) | Water after treatment |||
|---|---|---|---|---|---|---|---|
| Test volume (ml) | Acidity (pH) | Oil concentration (ppm) | | | Acidity (pH) | Oil concentration (ppm) | purification (%) |
| 900 | 9,5 | 195 | 0,79 | 10 | 9,5 | 30,6 | 84,30 |
| 900 | 9,5 | 195 | 0,79 | 15 | 9,5 | 37,8 | 80,62 |
| 900 | 9,5 | 195 | 0,79 | 20 | 9,5 | 35,4 | 81,85 |
| 900 | 9,5 | 195 | 0,79 | 25 | 9,5 | 39,1 | 79,95 |
| 900 | 9,5 | 195 | 0,79 | 30 | 9,5 | 35,1 | 82,00 |
| 900 | 9,5 | 195 | 0,79 | 35 | 9,5 | 39,4 | 79,79 |

Table 3

| Water before treatment | | | Precipitating chemical added (g of dry matter) | Stirring time (min) | Water after treatment | | |
|---|---|---|---|---|---|---|---|
| Test volume (ml) | Acidity (pH) | Oil concentration (ppm) | | | Acidity (pH) | Oil concentration (ppm) | Purification (%) |
| 900 | 6,5 | 1250 | 1,05 | 2 | 4,25 | 180,0 | 85,60 |
| 900 | 6,5 | 1250 | 1,05 | 2 | 3,50 | 80,0 | 93,60 |
| 900 | 6,5 | 1250 | 1,05 | 2 | 3,00 | 80,6 | 93,55 |
| 900 | 6,5 | 1250 | 1,05 | 2 | 2,50 | 101,0 | 91,92 |
| 900 | 6,5 | 1250 | 1,05 | 2 | 2,00 | 81,0 | 93,52 |

Table 4

| Water before treatment | | | Precipitating chemical added (g of dry matter) | Stirring time (min) | Water after treatment | | |
|---|---|---|---|---|---|---|---|
| Test volume (ml) | Acidity (pH) | Oil concentration (ppm) | | | Acidity (pH) | Oil concentration (ppm) | Purification (%) |
| 900 | - | 5171 | 0,42 | 2 | 3,5 | 844,5 | 83,66 |
| 900 | - | 5171 | 0,73 | 2 | 3,5 | 461,6 | 91,07 |
| 900 | - | 5171 | 1,47 | 2 | 3,5 | 167,4 | 96,76 |

Table 5

| Water before purification | | | Precipitating chemical added | Water after purification | | |
|---|---|---|---|---|---|---|
| Test volume (ml) | Acidity (pH) | Oil concentration (ppm) | (g of dry matter) | Acidity (pH) | Oil concentration (ppm) | Purification (%) |
| Sedimentation experiment 1 | | | | | | |
| 800 | 6,5 | 67,7 | 0,428 | 2,8 | 7,4 | 89,07 |
| 800 | 6,5 | 67,7 | 0,357 | 2,8 | 6,0 | 91,14 |
| 800 | 6,5 | 67,7 | 0,285 | 2,8 | 7,8 | 88,48 |
| 800 | 6,5 | 67,7 | 0,214 | 2,8 | 8,6 | 87,30 |
| Sedimentation experiment 2 | | | | | | |
| 800 | 6,5 | 57,0 | 0,428 | 2,8 | 2,0 | 96,49 |
| 800 | 6,5 | 57,0 | 0,357 | 2,8 | 5,0 | 91,23 |
| 800 | 6,5 | 57,0 | 0,285 | 2,8 | 6,0 | 89,47 |
| 800 | 6,5 | 57,0 | 0,214 | 2,8 | 8,0 | 85,96 |
| 800 | 6,5 | 50,3 | 0,183 | 2,8 | 8,7 | 82,70 |
| 800 | 6,5 | 57,0 | 0,071 | 2,8 | 23,5 | 58,77 |
| 800 | 6,5 | 57,0 | 0,036 | 2,8 | 57,0 | 0 |
| Flotation experiment | | | | | | |
| 800 | 6,5 | 57,0 | 0,428 | 2,8 | 6,0 | 89,47 |
| 800 | 6,5 | 57,0 | 0,357 | 2,8 | 3,0 | 94,74 |
| 800 | 6,5 | 57,0 | 0,285 | 2,8 | 11,0 | 80,70 |
| 800 | 6,5 | 57,0 | 0,214 | 2,8 | 5,0 | 91,23 |
| 800 | 6,5 | 57,0 | 0,036 | 2,8 | 57,0 | 0 |

Table 6

| Water before purification | | | Precipitating chemical added (g of dry matter) | Water after purification | | | |
|---|---|---|---|---|---|---|---|
| Test volume (ml) | Acidity (pH) | Oil concentration (ppm) | | Acidity (pH) | Mud volume (ml) | Mud volume/ Test volume (%) | Purification (%) |
| Sedimentation experiment 1 | | | | | | | |
| 800 | 6,5 | 67,7 | 0,428 | 2,8 | 43 | 5,4 | 89,07 |
| 800 | 6,5 | 67,7 | 0,357 | 2,8 | 60 | 7,5 | 91,14 |
| 800 | 6,5 | 67,7 | 0,285 | 2,8 | 56 | 7,0 | 88,48 |
| 800 | 6,5 | 67,7 | 0,214 | 2,8 | 55 | 6,9 | 87,30 |
| Sedimentation experiment 2 | | | | | | | |
| 800 | 6,5 | 57,0 | 0,428 | 2,8 | 42 | 5,3 | 96,49 |
| 800 | 6,5 | 57,0 | 0,357 | 2,8 | 55 | 6,9 | 91,23 |
| 800 | 6,5 | 57,0 | 0,285 | 2,8 | 65 | 8,1 | 89,47 |
| 800 | 6,5 | 57,0 | 0,214 | 2,8 | 70 | 8,8 | 85,96 |
| 800 | 6,5 | 50,3 | 0,183 | 2,8 | 80 | 10,0 | 82,70 |
| Flotation experiment | | | | | | | |
| 800 | 6,5 | 57,0 | 0,428 | 2,8 | 24 | 3,0 | 89,47 |
| 800 | 6,5 | 57,0 | 0,357 | 2,8 | 20 | 2,5 | 94,74 |
| 800 | 6,5 | 57,0 | 0,285 | 2,8 | 20 | 2,5 | 80,70 |
| 800 | 6,5 | 57,0 | 0,214 | 2,8 | 52 | 6,5 | 91,23 |
| 800 | 6,5 | 57,0 | 0,071 | 2,8 | 40 | 5,0 | - |

PRECIPITATING CHEMICAL

FIELD OF THE INVENTION

The invention relates to a precipitating chemical and a method of chemical precipitation and application of the precipitating chemical and method, for use in the treatment of dissolved and/or suspended organic and/or inorganic substances and particles in liquids, preferably hydrocarbons in water. To a great degree such particles and compounds are formed of mineral and/or rock particles, heavy metals, salts, phosphorous compounds, alcohols, lipids, aromatics and cellulose, said particles and compounds being present, to a great degree, in for example sewage and waste water from i.a. homes and industrial enterprises. The precipitation process is activated preferably by means of acids or alternatively by means of bases.

BACKGROUND OF THE INVENTION

In connection with research on biological purification methods, mainly on the treatment of glycol and phenol in waste water, a precipitating chemical with an associated precipitation process has been discovered, which exhibits, relative to treatment of glycol and phenol in waste water, substantially better purification results when used for the purification of hydrocarbon-bearing waste water and a number of dissolved and/or suspended organic and/or inorganic particles and substances in liquids, including particles and compounds formed, to a great degree, of mineral and/or rock particles, heavy metals, salts, phosphorous compounds, alcohols, lipids, aromatics and cellulose, said particles and compounds being present, to a great degree, in for example sewage and waste water from i.a. homes and industrial enterprises.

Known Technique

In prior art there exists a lot of equipment and/or techniques for treating dissolved and/or suspended organic and/ or organic substances and particles in liquids, including substances and particles present in hydrocarbon-bearing waste water and for example in sewage and waste water from i.a. homes and industrial enterprises. Depending an the situation, place and extent of and need for purification of waste liquids, preferably hydrocarbon-bearing water, this may i.a. be carried out by means of ultrafiltration (membranes), an oil separator or a coalescer, hydrocyclones or centrifuges, by vacuum distillation or use of activated carbon. Purification of sewage-bearing water is often carried out by means of biological purification or by precipitation by chemicals. The most common precipitating chemicals are based on iron, aluminium and lime, cf. WO 8605826 and JP 56158194. These chemicals are often added to waste water in combination with a so-called flocculant, often consisting of a mixture of bentonite of the smectite type and a polymer, cf. SE 501216, U.S. Pat. No. 5,204,007 and JP 56158194. In some cases the precipitation is activated without the use of the above-mentioned type of precipitating chemical as the acidity of the waste water is adjusted to a specific pH-value or to within a certain pH range, cf. U.S. Pat. No. 5,204,007 and JP 56158194, Drawbacks of Known Technique Common features of most known purification processes and techniques are that they cannot work satisfactorily in all the different conditions often occurring in a normal situation of operation. Different conditions may for example occur when the pH-values (acidity) of a waste liquid vary a lot, or in that the waste liquid contains varying amounts of suspended substances and/or dissolved organic and/or inorganic compounds as i.a. soap compounds. In addition known technique provides efficient treatment of only a limited number of chemicals/elements in a single process, whereas the present invention can offer efficient treatment of a wider range of chemicals in a single process, which could be accomplished through application of known purification methods, but wherein several such known purification methods would possibly have to be combined in order to achieve the same purification effect as that offered by the present invention in a single process. In addition, several known purification processes and purification techniques are both time-consuming and costly as compared to the purification method in question.

OBJECT OF THE INVENTION

The object of the invention is to provide a precipitating chemical which is well suited, when activated, for separating preferably hydrocarbons from water, but also for separating dissolved and/or suspended organic and/or inorganic substances and particles from other waste liquids, including substances and particles in for example sewage and waste water from i.a. homes and industrial enterprises, such substances and particles being formed for example of mineral and/or rock particles, heavy metals, salts, phosphorous compounds, alcohols, lipids, aromatics and cellulose. The use of said precipitating chemical provides a novel, more simple and more efficient way of treating waste liquids, which does not have the drawbacks that known purification processes and purification techniques suffer from.

Realization of the Object(s)

The object is realized through the features specified in the description below and in the following claims.

The precipitating chemical may be made according to the following method, or unitary recipe, and preferably in the following order:

1. 1 liter of water is filled into a container.
2. 40 grams of bentonite (dry matter), preferably sodium montmorillonite, is added and stirred into the water phase until the mixture is homogenous.
3. 0.5 grams of polymer (dry matter), preferably of the polyacrylamide type, is added to the above liquid mixture and stirred together, preferably for more than 2 minutes, until the mixture thickens and has a preferably dough-like consistency.
4. 15 grams of sodium polyphosphate (dry matter) is added to the above mixture and stirred together to a homogenous and substantially less viscous mixture, so that the precipitating chemical is fluid after that and can be mixed with the waste liquid.

According to this unitary recipe the components of the dry matter, bentonite:sodium polyphosphate:polyacrylamide are mixed in the ratio by weight 80:30:1, respectively.

Moreover, in this connection laboratory experiments have been carried out with the purpose of finding out to what degree the order of the components in the mixing of the precipitating chemical affects the purification result, or the degree of purification. The degree of purification is a measure in per cent of how much of an initial contamination, for example hydrocarbons, is removed by means of the purification process, this measure being expressed in number of parts by weight of for example hydrocarbons removed per million parts by weight of water, and wherein the measurement, or the concentration, is normally stated in ppm (parts per million).

The experiments were carried out on hydrocarbon-bearing water, wherein the precipitating chemical was added to the water, and a subsequent chemical precipitation according to this invention was implemented, but wherein seven different combinations of mixing the components of the precipitating chemicals, including the combination according to the above-mentioned unitary recipe, were tested on the hydrocarbon-bearing water.

In the experiments the degree of purification was measured with respect to how much hydrocarbon was precipitated from the hydrocarbon-bearing water. On the background of the results from the experiments, it may therefore seem that the order of mixing the components of the precipitating chemical has little effect on the degree of purification of hydrocarbons from the water, degrees of purification in the range of 89–94% being achieved.

On the other hand, some of the above-mentioned combinations resulted in difficulties in achieving a satisfactory mixing of the components of the precipitating chemical, the mixing resulting in some clotting, which lead to, among other things, that a more powerful stirring device had to be used for the mixing of the components. On the basis of the problems last mentioned, the method according to the order of the above-mentioned unitary recipe was of advantage. Another advantageous method, which provided a correspondingly good degree of purification in the experiments as with the use of the above unitary recipe, was first to mix the dry components of the precipitating chemical together in a non-specific order, and then to add water to the mixture of dry matter.

The ratio by weight of the dry components bentonite, sodium polyphosphate and polyacrylamide in the precipitating chemical is important in order to achieve the best possible degree of purification, which is achieved, according to the above unitary recipe, in that the ratio by weight of bentonite:sodium polyphosphate:polyacrylamide is 80:30:1, respectively.

Moreover, it should be mentioned that some deviation from this ratio by weight does not affect the degree of purification to any substantial degree, and that each dry component of the ratio by weight can vary to some degree. In this connection further experiments were carried out on the hydrocarbon-bearing water last mentioned, wherein satisfactory degrees of purification with respect to hydrocarbons were measured by first varying the amount of dry matter of sodium polyphosphate added and then varying the amount of dry matter of polyacrylamide added, respectively. The experiments showed that a satisfactory degree of purification was achieved by mixing bentonite:sodium polyphosphate:polyacrylamide in a ratio by weight in the range of 80:20–47:0.5–1.7; the optimum degree of purification being achieved by a ratio by weight of 80:30:1, i.e. by the use of the unitary recipe.

In addition to the above-mentioned experiments, attempts have been made through further experiments and instead of sodium polyphosphate to find one or more alternative chemicals, which possibly provide the same purifying effect when used in the precipitating chemical. In this connection three substances or chemicals were tried, the three being lignin, lignite and lignosulphate.

Chemically speaking, lignin is a polyphenol in the form of aromatic rings, lignin forming a natural strengthening component in the cell walls of a number of plants, lignin being substantially more resistant to decomposition than for example cellulose. Lignin is a chemical precursor of coal, lignin being transformed in a natural carbonization process by the loss of oxygen from said aromatic rings first to peat and then to a low-grade coal, lignite. Normally lignin is a by-product in the production of cellulose, whereas lignite is dug out in quarries or mines. Lignite contains a lot of plant material and thereby also much humic acid. Lignosulphonate is produced chemically by sulphonation of lignin, chromium often being added for purification-technical purposes.

In the utilization of either lignin or lignite, or lignosulphonate in the above-mentioned precipitating chemical, and as a substitute for sodium polyphosphate, and for the purification of hydrocarbon-bearing water according to the present invention, lignite exhibited a better degree of purification than the two other substances. On the other hand, lignite was not better suited than sodium polyphosphate to achieve an optimum degree of purification with respect to purification of hydrocarbon-bearing water.

With a view to possible transport or storing of the chemical before use, it may be of advantage to concentrate the precipitating material, smaller amounts of water than specified in the unitary recipe being added to the mixture of dry matter, but on the condition that the ratio by weight of the dry components remain constant. On subsequent application water is then added in sufficient amounts for the precipitating chemical to be diluted to the desired concentration and preferably to a concentration according to the unitary recipe.

Utilization and actuation of the above-mentioned liquid mixture preferably for the chemical precipitation of hydrocarbons from water, but also for separation of dissolved and/or suspended organic and/or inorganic substances and particles in other waste liquids, including for example sewage and waste water from i.a. homes and industrial enterprises, such substances and particles being formed for example of mineral and/or rock particles, heavy metals, salts, phosphorous compounds, alcohols, lipids, aromatics and cellulose, is implemented in the following order and in the following way:

1. The precipitating chemical is added to the waste liquid in a weight concentration of preferably 0.07–2 grams dry matter per liter of waste liquid, the weight concentration of the precipitating chemical depending on what types of contamination and concentrations thereof that the waste liquid is formed of, among other things.
2. The liquid mixture is stirred in a suitable manner to achieve good mixing of the precipitating chemical and waste liquid, preferably for 10–15 minutes or as long as necessary to achieve good blending of them.
3. An acid or a base is added to the liquid mixture in an amount sufficient for the chemical acidity of the mixture to reach a pH-value of 4.0 or lower, or a pH-value of 8.0 or more.
4. The liquid mixture is stirred and mixed in a suitable manner and sufficiently long, at least 0.5 minutes at 190 revolutions/minute in a so-called jar test, to achieve a good blending thereof.
5. The liquid mixture rests and chemical, precipitation occurs in that the waste matter(s), preferably hydrocarbons, flakes and separates from the liquid phase and is then deposited or floated from the liquid mixture.

For the addition of the precipitating chemical to a contaminated liquid mixture, it is difficult to specify a specific and optimum weight concentration of the precipitating chemical, as a waste liquid may be formed of random types and concentrations of contaminants, so that the optimum weight concentration of the precipitating chemical must be adjusted to the waste liquid in question.

Purification of waste liquid by means of the method and precipitating chemical concerned, takes place through a precipitation process based on i.a. ionic binding, ion exchange between the components of the precipitating chemical and on coagulation of the contaminants of the waste liquid, so-called flocculation.

Bentonite is a clay material, in this connection preferably of the sodium montmorillonite type, characterized, like most other clay minerals, by taking a plate-shaped crystal structure, which forms groups of parallel and loosely connected plates. Such structural properties and the chemical composition of the clay mineral provide the mineral with a very large and chemically reactive surface area relative to a given mineral volume, which has the effect, among other things, that water is easily adsorbed on the clay plates, and that the clay thereby swells. Without any further explanation, the clay plates exhibit alternating positive and negative electric charges.

A polymer, on the other hand, is built of one or more basic chemical units, so-called monomers, bonding into long chains and exhibiting negative electric charges. By addition and admixture of a polymer, in this connection preferably of the polyacrylamide-type, in water together with bentonite, the polymer chains bond to some of the positive charges of the clay plate, which causes clay particles, polymer and water to bond. Thereby the mixture will be more viscous or, as in the preparation of the precipitating chemical concerned, the mixture will transform into a lump of a dough-like consistency.

When such a dough-like lump is used, for example for purifying water containing oil, wherein oil particles will bond to the outer surface of the lump, the degree of purification will be very poor as a result of the reactive surface area of the lump being very small relative to the volume of the lump. To increase the surface area of the lump, and thereby, in this connection, dramatically improve the degree of purification, it is therefore necessary to dilute the mixture. According to the invention this is done by adding and stirring into the mixture a viscosity-reducing chemical, preferably sodium polyphosphate. Thereby the lump is broken into a number of smaller aggregates, and water is released from the mixture, so that the mixture is less viscous and is suitable for mixing with for example oily water. When sodium polyphosphate is added, the mixture receives phosphate ions of a negative electric charge, said ions, like the polymer chains, being attracted to and bonding with some of the positive electric charges of the clay plates. Such electric bonding causes associated charges to be. neutralized, and the clay plates, or in practice aggregates consisting of clay particles, polymer and water, to exhibit negative electric charges. Such aggregates with negative electric charges have a mutually repellent effect, so that the aggregates will not adhere together.

When the diluted and deflocculated mixture, in the following referred to as the precipitating chemical, is added to, for example, an emulsion consisting of oily water, experience has shown that oil droplets dispersed in the emulsion will be attracted to and collect on the surfaces of the aggregates of precipitating chemical. In principle, dispersed oil droplets in an emulsion do not exhibit any electric charge and should, according to electric ionic bonding theory, not allow attraction to the negatively charged precipitating chemical aggregates concerned. On the other hand, from thermodynamic considerations in connection with theory of emulsion stability, and in particular in connection with the emulsion properties of atomised, or colloidal particles, there are several proofs of attraction between particles of an emulsion, including so-called London-van der Waal attraction forces, with no further description of such forces, it is experientially obvious that for example oil particles in oily water are attracted and bonded to the surfaces of the precipitating chemical aggregates.

After mixing of the precipitating chemical in for example oily water, an acid is preferably added to the mixture in amounts sufficient for the pH-value of the mixture to be 4.0 or lower. Alternatively a base can be added to the mixture in amounts sufficient for the pH-value of the mixture to be 8.0 or more. The addition of an acid or a base causes the polymer chains of the aggregates of precipitating chemical to be attracted to each other and flocculate. Thereby the aggregates and oil droplets adsorbed on the surfaces of the aggregates also flocculate, so that larger accumulations of such aggregates are formed. Such accumulations of aggregates are physically much larger than individual and dispersed aggregates, which results in easy sedimentation, possibly flotation, of such accumulations from the mixture. The presence of bentonite in such aggregates, and in particular in larger accumulations of such aggregates, is also a factor contributing to quick sedimentation of the accumulations, bentonite also working as a weight material in the accumulations and preventing oil particles, which are normally lighter than the water in which they are emulsified, from rising as a consequence of buoyancy forces.

In connection with precipitation it is important to point out that a polymer, preferably polyacrylamide, is highly sensitive to acidities of a pH-value of 4.0 or lower, or of a pH-value of 8.0 or more. Thus, for this reason it is important that the precipitating chemical is mixed into for example oily water with a pH-value of between 4.0 and 8.0, in which acidity range the polymer will not flocculate. In those cases where for example oily water initially has a pH-value outside the preferred acidity range, it is favourable, before adding the precipitating chemical, to adjust the acidity of the mixture to a pH-value within the preferred acidity range. This ensures that on addition of the precipitating chemical to for example oily water, a good mixing of the oil contamination of the mixture and the precipitating chemical is accomplished, so that oil droplets are adsorbed on the surfaces of the precipitating chemical aggregates before the precipitation process is initiated.

Advantages Achieved Through the Invention

Compared to most known technique, the precipitating chemical is easy to produce, and the use of the chemical requires little and simple adaptation of equipment. This results in increased user-friendliness and utility, i.a. in purification plants for sewage water and waste water, plants for the purification of hydrocarbon-bearing water on and from boats, oil rigs, fixed and floating installations for the production of oil, and for the purification of hydrocarbon-bearing cuttings. The precipitating chemical may possibly also be used with advantage in combination with known purification technique.

BRIEF DESCRIPTION OF FIGURES AND TABLES

Figure 2:
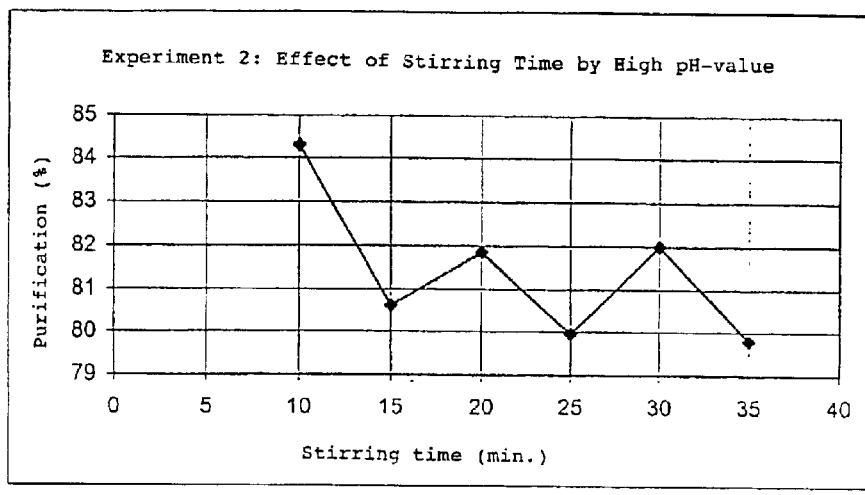
Figure 3:
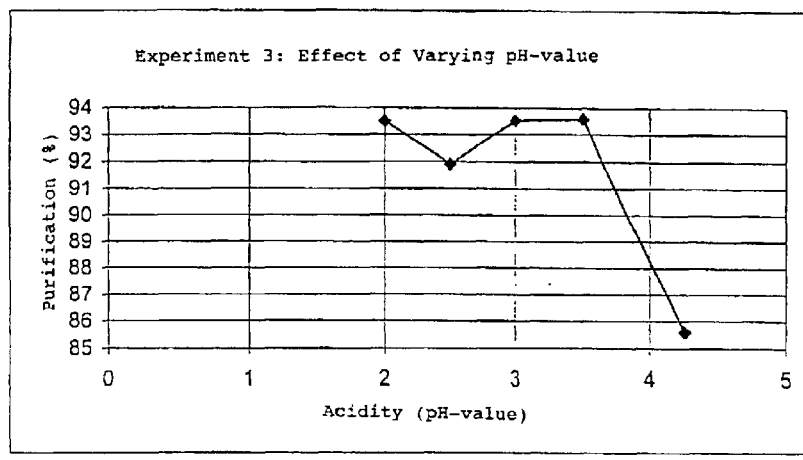
Figure 4:
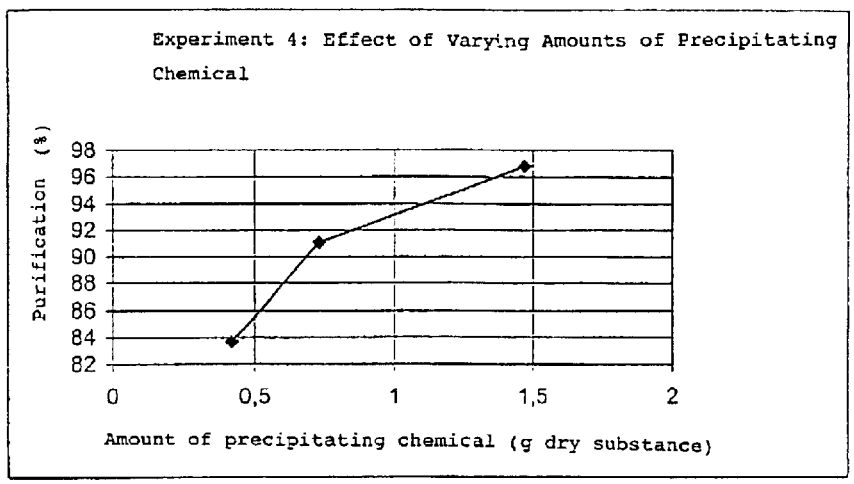
Figure 5:
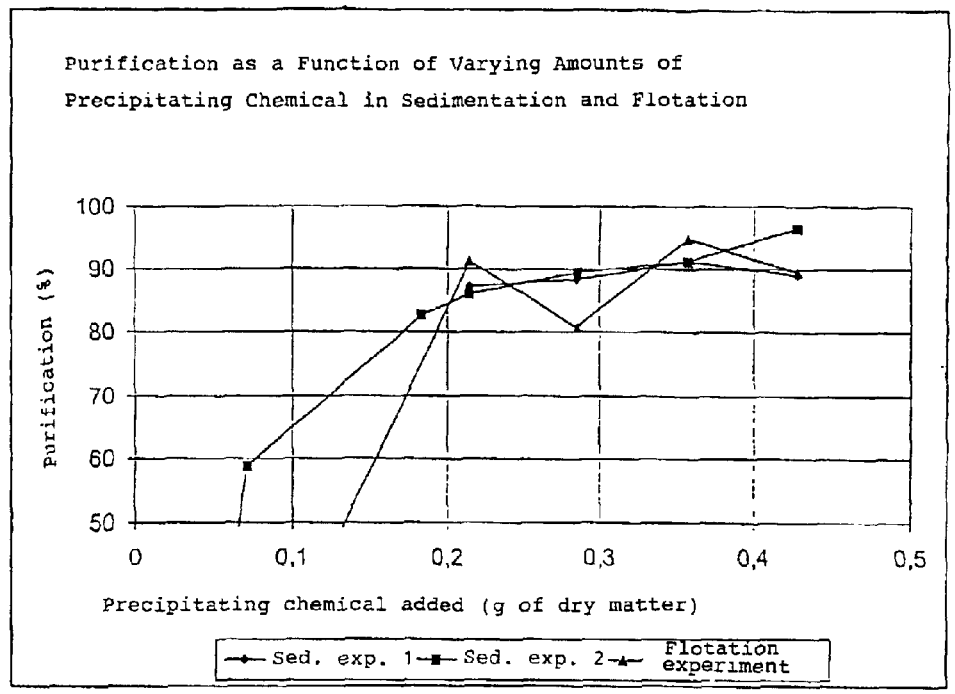
Figure 6:
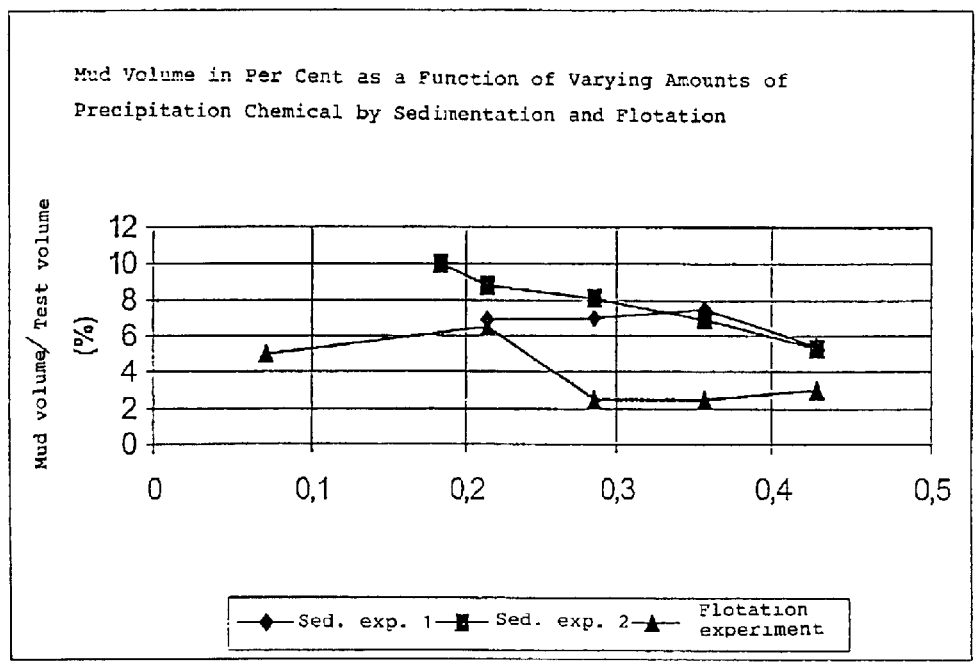

In the following part of the description, referring to figures and tables, results from laboratory tests will be shown, in which said precipitation chemical was used to purify hydrocarbon-bearing water, and where:

FIG. 1 and associated Table 1 showing the effect of the stirring time of the chemical on the degree of purification achieved through the use of the precipitating chemical in hydrocarbon-bearing water with an initial pH-value of 6.5;

FIG. 2 and associated Table 2 showing the effect of the stirring time of the chemical on the degree of purification achieved when the precipitating chemical is used in hydrocarbon-bearing water with an initial pH-value of 9.5;

FIG. 3 and associated Table 3 showing the achieved degree of purification as a function of chemically activated precipitation with varying pH-values, by the use of the precipitating chemical in hydrocarbon-bearing water;

FIG. 4 and associated Table 4 showing the achieved degree of purification as a function of varying amounts of precipitating chemical added to hydrocarbon-bearing water;

FIG. 5 and associated Table 5 summarize results from three experiments, showing an achieved degree of purification as a function of varying amounts of precipitating chemical added to hydrocarbon-bearing water, the sedimentation method being used in two of the experiments, the flotation method being used in one of the experiments; and FIG. 6 and associated Table 6 summarizing the results from three corresponding experiments, showing the achieved mud volume in per cent as a function of varying amounts of precipitating chemical added to hydrocarbon-bearing water, the sedimentation method concerned being used in two of the experiments, and a flotation method being used in one of the experiments.

DESCRIPTION OF EXPERIMENTS

Through the use of the precipitating chemical according to the above-mentioned unitary recipe for the purification of hydrocarbon-bearing water, it was sought to optimize the degree of purification, or the purification degree. It has been sought to do this through a number of small-scale laboratory experiments, each being performed in a standardized way in a so-called jar test. To make precipitating chemical for the experiments, there was used i.a. Wyoming bentonite, which is formed of pure sodium montmorillonite as opposed to other types of montmorillonite used, which contain, in addition to sodium montmorillonite, also larger or smaller amounts of calcium montmorillonite. In the precipitating chemical polyacrylamide of medium anionic strength and with a molecular weight in the range of 17–18 million grams per mol was also used.

Adjustment of acidity, indicated by a pH-value, was implemented by addition of hydrochloric acid. In the experiments the hydrocarbon concentration in the water was measured before and after precipitation. The concentration is stated in ppm (parts per million), which represents the number of parts by weight of hydrocarbons for every million parts by weight of water.

Experiment 1

Effect of Stirring Time

Hydrocarbon-bearing water from a boat was tested after the water had been coarse-treated by means of known flotation and coalescing techniques. The pH-value of the water was 6.5, and the water contained a lot of loose particles and gasses that lead to flotation in the samples. In all experimental tests 10 g complete precipitating chemical, corresponding to 0.53 g dry chemical, was added to 900 ml of the hydrocarbon-bearing water and stirred at 190 revolutions/minute in said jar test. In each test the precipitation was then activated by adjustment of the pH-value of the water to 2.5. The purpose of the experiment was to find out how the stirring time at the admixture of the chemical affected the degree of purification. The experiment showed a very good degree of purification in all tests of the experiment, but also a marginal improvement in the degree of purification by more than 8 minutes' stirring, cf. FIG. 1 and Table 1.

Experiment 2

Effect of Stirring Time by High pH-value

In this experiment the precipitating chemical was added to hydrocarbon-bearing water from a purification plant for special waste and stirred at 190 revolutions/minute in said jar test. Like in Experiment 1 it was sought to determine the degree of purification as a function of the stirring time at the admixture of the chemical. The waste water contained a lot of soap, so that the water was highly alkaline with a pH-value of 9.5 . A In all experimental tests 15 g of complete precipitating chemical, corresponding to 0.79 g of dry chemical, was added to 900 ml of hydrocarbon-bearing water. Immediately after the addition of the precipitating chemical the contaminants started to flocculate, which happened without addition of acid or base to adjust the acidity of the mixture. This proved that an initial pH-value of 9.5 immediately activated chemical precipitation in hydrocarbon-bearing water, whereas Experiment 1 showed that an initial, pH-value of 6.5 did not immediately activate chemical precipitation in hydrocarbon-bearing water. Moreover, Experiment 2 showed that the stirring time did not have any systematic effect on the degree of purification, and the degree of purification was in fact slightly poorer by longer stirring, cf. FIG. 2 and Table 2. The degree of purification in Experiment 2 was generally poorer than the degree of purification in Experiment 1, which is believed to be related to the fact that chemical precipitation due to high initial pH-value started before satisfactory flaking had occurred in the hydrocarbon-phase of the waste water. Through testing it has been found that chemical precipitation through addition of an acid or a base, works best in waste water with an initial pH-value of between 4.0 and 8.0. By pH-values outside the above-mentioned pH-range the waste water can be pH-adjusted to within the above pH-range before addition of the precipitating chemical. Thereby immediate flaking is avoided, and the degree of purification increases.

Experiment 3

Effect of Varying pH-values

Also in this experiment the precipitating chemical was added to hydrocarbon-bearing water from a purification plant for special waste and stirred at 190 revolutions/minute for 2 minutes in said jar test. Before addition of the precipitating chemical the water had an acidity of 6.5, and a high content of suspended solid particles. In all experimental tests 20 g of complete precipitating chemical, corresponding to 1.05 g of dry chemical, was added to 900 ml of the hydrocarbon-bearing water. A different amount of hydrochloric acid was added in each experimental test, so that the pH-value of the liquid mixture was the variable factor of the experiment. The purpose of the experiment was to find out which acidity provided the best degree of purification. The experiment showed the best degree of purification by pH-values of about 3.5 or lower, cf. FIG. 3 and Table 3.

Experiment 4

Effect of Varying Amounts of Precipitating Chemical

In Experiment 3 it was shown that a pH-value of 3.5 was optimal for purifying hydrocarbon-bearing water. The purpose of Experiment 4 was to vary the amount of precipitating chemical added and find out how this affected purification.

Also in this experiment precipitating chemical was added to 900 ml of water containing a lot of hydrocarbons from a purification plant for special waste, and stirred at 190 revolutions/minute for 2 minutes in said jar test. In all tests hydrochloric acid was added to the mixture to achieve a constant pH-value of 3.5. Up to a certain level the results showed that the degree of purification increased with the amount of precipitating chemical added, cf. FIG. 4 and Table 4.

Experiment 5

Degree of Purification as a Function of Varying Amounts of Precipitating Chemical in Sedimentation or Flotation The purpose of the experiment was to vary the amount of precipitating chemical added in the sedimentation method concerned and in a flotation method for subsequent comparison of degree of purification achieved by the two methods of purification, cf. FIG. 5 and Table 5. In all tests precipitating chemical was added to 800 ml of hydrocarbon-bearing water from a purification plant for special waste and stirred at 190 revolutions/minute for 2 minutes in said jar test. In all tests chemical precipitation was implemented by maintaining the pH-value of the mixture constant at 2.8. For both purification methods the results showed that up to a certain level the degree of purification increased with the amount of precipitating chemical added. Optimum degree of purification was also somewhat better by sedimentation, cf. FIG. 5 and Table 5.

Experiment 6

Mud Volume in Per Cent as a Function of Varying Amounts of Precipitating Chemical in Sedimentation or Flotation The purpose of the experiment was to vary the amount of precipitating chemical added in the sedimentation method concerned and in a flotation method, for subsequent comparison of precipitated mud volume for the two purification methods, cf. FIG. 6 and Table 6. In all tests precipitating chemical was added to 800 ml of hydrocarbon-bearing water from a purification plant for special waste and stirred at 190 revolutions/minute for 2 minutes in said jar test. In all tests chemical precipitation was implemented by maintaining the pH-value of the mixture constant at 2.8. The experiment showed a tendency for the precipitated mud volume to decrease with increasing addition of the precipitating chemical. Moreover, the results showed that mud volume precipitated by flot tion was substantially smaller than by sedimentation, especially by increasing addition of the precipitating chemical, while at the same time the degree of purification was very good. This proves that flotation as compared to sedimentation causes increased thickening of the mud, so that by flotation a given amount by weight of mud has a smaller mud volume than the corresponding volume by sedimentation. Industrially this may for example be utilized in that hydrocarbon-bearing waste water is first treated by means of the sedimentation method, which provides the optimum degree of purification. Then precipitated mud is treated by means of the flotation method, which gives a minimal mud volume of the contamination.

What is claimed:

1. A multi-component precipitating chemical for admixing with a contaminated liquid, including oily water, sewage and waste water, to produce a liquid mixture thereof, said precipitating chemical causing at least one of dissolved and suspended contaminants, including at least one of organic and inorganic contaminants, to separate from the contaminated liquid when the precipitating chemical is activated, wherein said multi-component precipitating chemical comprises:

water;

a montmorillonite bentonite;

a polyacrylamide polymer exhibiting negative electric charges; and at least one of sodium polyphosphate and lignite, wherein chemical precipitation is activated in a single-step operation by adjusting the pH-value of the liquid mixture to one of $\leq 4.0$ and $\geq 8.0$ by adding an acid or a base, respectively; and wherein the polyacrylamide polymer, water and bentonite bond into aggregates, and wherein at least one of the sodium polyphosphate and lignite is effective in reducing the degree to which the aggregates adhere together.

2. The multi-component precipitating chemical according to claim 1, wherein dry components of said precipitating chemical are assembled in a ratio by weight of:

80 parts of sodium montmorillonite bentonite;

20–47 parts of at least one of sodium polyphosphate and lignite; and wherein said precipitating chemical is admixed with said single-step operation,and the chemical precipitation thus prepared is then initiated by adding a base to said liquid mixture until the pH-value thereof is 8.0 or more.

3. The precipitating chemical according to claim 2, wherein dry components of said precipitating chemical are assembled in a ratio by weight of:

80 parts of sodium montmorillonite bentonite;

30 parts of at least one of sodium polyphosphate and lignite; and 1 part of polyacrylamide polymer.

* * * * *

UNITED STATES PATENT AND TRADEMARK OFFICE
CERTIFICATE OF CORRECTION

PATENT NO.         : 6,916,431 B2
APPLICATION NO. : 10/239468
DATED                : July 12, 2005
INVENTOR(S)      : Keller It is certified that error appears in the above-identified patent and that said Letters Patent is hereby corrected as shown below:

Column 2, line 37, replace "liter" with -- litre --

Column 3, line 58, replace "lignosulphate" with -- lignosulphonate --

Column 4, line 38, replace "liter" with -- litre --

Column 5, line 45, replace "be. neutralized" with -- be neutralized --

Column 5, line 67, replace "forces, with" with -- forces. With --

Column 6, line 42, replace "technique" with -- techniques --

Column 8, line 6, replace "A In all" with -- In all --

Column 9, line 47, replace "flot ion" with -- flotation --

Column 10 line 39, replace "wherein said precipitating chemical is admixed with said single-step operation, and the chemical precipitation thus prepared is then initiated by adding a base to said liquid mixture until the pH-value thereof is 8.0 or more." with -- 0.5-1.7 parts of polyacrylamide polymer.--

Signed and Sealed this

Seventeenth Day of April, 2007

JON W. DUDAS
*Director of the United States Patent and Trademark Office*